United States Patent
Bae et al.

(10) Patent No.: US 9,253,471 B2
(45) Date of Patent: Feb. 2, 2016

(54) DEPTH CAMERA, MULTI-DEPTH CAMERA SYSTEM AND METHOD OF SYNCHRONIZING THE SAME

(71) Applicant: SAMSUNG ELECTRONICS CO., LTD., Suwon-Si, Gyeonggi-Do (KR)

(72) Inventors: Kwanghyuk Bae, Seoul (KR); Kyu-Min Kyung, Seoul (KR); Tae-Chan Kim, Yongin-Si (KR); Seunghee Lee, Hwaseong-Si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 424 days.

(21) Appl. No.: 13/767,521

(22) Filed: Feb. 14, 2013

(65) Prior Publication Data

US 2013/0242058 A1  Sep. 19, 2013

(30) Foreign Application Priority Data

Mar. 19, 2012  (KR) .................. 10-2012-0027738

(51) Int. Cl.
*H04N 13/02* (2006.01)
*H04N 5/12* (2006.01)
*G01S 17/10* (2006.01)
*G01S 17/87* (2006.01)
*G01S 17/89* (2006.01)
*H04N 5/04* (2006.01)

(52) U.S. Cl.
CPC .......... *H04N 13/0271* (2013.01); *G01S 17/107* (2013.01); *G01S 17/87* (2013.01); *G01S 17/89* (2013.01); *H04N 5/04* (2013.01); *H04N 5/123* (2013.01)

(58) Field of Classification Search
CPC ..... H04N 13/0271; H04N 5/04; H04N 5/123; H04N 5/126; G01S 17/107; G01S 17/87; G01S 17/89
USPC ............................................. 348/47
See application file for complete search history.

(56) References Cited

U.S. PATENT DOCUMENTS

| | | | |
|---|---|---|---|
| 5,534,992 A * | 7/1996 | Takeshima et al. | 356/5.1 |
| 5,978,084 A * | 11/1999 | Blake | 356/460 |
| 7,170,492 B2 | 1/2007 | Bell | |
| 2010/0309292 A1 | 12/2010 | Ho et al. | |
| 2011/0169922 A1 | 7/2011 | Lee et al. | |
| 2011/0188027 A1 | 8/2011 | Bamji | |
| 2011/0249098 A1 | 10/2011 | Chiba et al. | |
| 2013/0176550 A1 * | 7/2013 | Ovsiannikov et al. | 356/5.01 |

FOREIGN PATENT DOCUMENTS

| | | |
|---|---|---|
| JP | 10186550 | 7/1998 |
| JP | 4529841 | 6/2010 |
| JP | 2010166218 | 7/2010 |
| JP | 2011160299 | 8/2011 |
| KR | 1020110011244 A | 2/2011 |

* cited by examiner

*Primary Examiner* — Michael Lee
(74) *Attorney, Agent, or Firm* — Volentine & Whitt, PLLC

(57) ABSTRACT

A depth camera includes a sensor unit receiving a reflected light and in response thereto outputting an electrical sensing signal; and a synchronization information calculation unit calculating a performance index with reference to the sensing signal, and with reference to the performance index, generating synchronization information for synchronizing a demodulation clock for sensing the received reflected light. The sensor unit adjusts the frequency and/or phase of the demodulation clock with reference to the synchronization information.

16 Claims, 11 Drawing Sheets

DEPTH CAMERA, MULTI-DEPTH CAMERA SYSTEM AND METHOD OF SYNCHRONIZING THE SAME

CROSS-REFERENCE TO RELATED APPLICATIONS

This U.S. non-provisional patent application claims priority under 35 U.S.C. §119 of Korean Patent Application No. 10-2012-0027738, filed on Mar. 19, 2012, the entire contents of which are hereby incorporated by reference.

BACKGROUND

The present inventive concept herein relates to image sensors, and more particularly, to a depth camera for obtaining a three dimensional image and a method of synchronizing the depth camera.

As image processing technology develops, an interest in the field of modeling an object in a three-dimensional image is becoming great. Modeling an object in a three-dimensional image can be applied to a virtual reality movie and to a computer graphic of a video game. Thus, an image modeled in three dimensions is expected to be applied to various fields.

Three-dimensional image information includes geometry information and color information. The geometry information can be obtained using a depth image. The depth image can be directly obtained using filming equipment such as a depth camera. The depth image can also be indirectly obtained using an image process which is a computer vision technology, without using a depth camera.

In the method of obtaining the depth image using the depth camera, a method of measuring a time taken until an emitted light returns after it is reflected by an object is widely used. The time is referred to as "time of flight (ToF)". To realize a three dimensional image in a more realistic angle, a multi-ToF method using a plurality of depth cameras is needed. To realize a three dimensional image using a plurality of depth cameras, synchronization of the plurality of depth cameras becomes an important issue. A trigger for initialization is periodically applied to a plurality of depth cameras to perform synchronization. However, in this method, a frame rate of the three-dimensional image is reduced and a deviation may occur in synchronization because of a distance difference between a host providing a trigger and the cameras. If using emitting lights having different frequencies or pulse widths, a depth error may increase due to interference between the depth cameras.

Thus, to obtain a three-dimensional image having high resolution and high performance in a multi-ToF method, a technology that can perform efficient synchronization of the depth cameras is needed.

SUMMARY

Embodiments of the inventive concept provide a depth camera. The depth camera may include a sensor unit configured to receive a reflected light and in response thereto to output an electrical sensing signal; and a synchronization information calculation unit configured to calculate a performance index with reference to the electrical sensing signal, and with reference to the performance index to generate synchronization information for synchronization of a demodulation clock for sensing the received reflected light, wherein the sensor unit is configured to adjust at least one of a frequency and a phase of the demodulation clock with reference to the synchronization information.

Embodiments of the inventive concept also provide a method of synchronizing a depth camera receiving a light reflected from a target object to generate depth information. The method may include sensing a reflected light being received, and in response thereto outputting an electrical sensing signal; calculating a performance index of the depth camera with reference to the electrical sensing signal; and with reference to the performance index, adjusting at least one of a frequency and a phase of a demodulation clock for sensing the received reflected light.

Embodiments of the inventive concept also provide a multi depth camera system. The multi depth camera system may include a plurality of depth cameras including at least one reference camera; and a host configured to receive depth information for one or more areas of a target object from each of the plurality of depth cameras and in response thereto to generate a three-dimensional image of the one or more areas of the target object, wherein at least one of the depth cameras includes a sensor unit that senses reflected light received from the object in response to a demodulation clock of the at least one depth camera, and wherein the at least one depth camera synchronizes the demodulation clock to the reference camera in response to the received reflected light.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Figure 1:
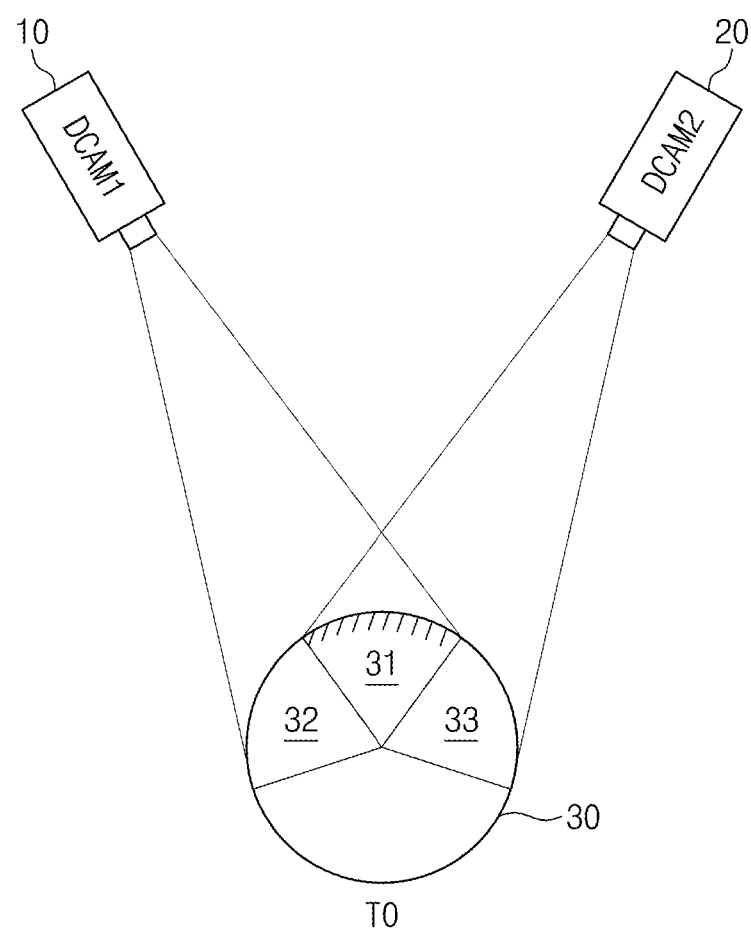
FIG. 1 is a drawing illustrating a multi-depth camera.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

As used herein, the term "and/or" includes any and all combinations of one or more of the associated listed items and may be abbreviated as "/". It will be understood that when an element is referred to as being "connected" or "coupled" to another element, it can be directly connected or coupled to the other element or intervening elements may be present. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a drawing illustrating a multi-depth camera for providing a three-dimensional image as an illustration. Referring to FIG. 1, the multi-depth camera includes a plurality of depth cameras 10 and 20 measuring depth information of an object 30. Although not illustrated in the drawing, a host may be included which composes geometry information provided from each of depth cameras 10 and 20 to form a three-dimensional image.

First depth camera 10 can sense depth information on areas 31 and 32 of object 30. However, first depth camera 10 cannot sense depth information on an area 33. Area 33 is called an occlusion of the first depth camera 10. Second depth camera 20 can sense depth information on areas 31 and 33 of object 30. However, second depth camera 20 cannot sense depth information on area 32. Area 32 is called an occlusion of second depth camera 20.

The depth information that can be obtained at the same time by multi-depth cameras 10 and 20 is geometry information regarding area 31. Three-dimensional image information regarding area 31 can be created by combining depth information obtained from multi-depth cameras 10 and 20. However, three-dimensional image information regarding areas 32 and 33 cannot be generated. Thus, if more depth cameras are employed, depth information on a wider area can be obtained. The depth information obtained from a plurality of depth cameras should be information measured at the same time. If synchronization of depth cameras is incomplete, geometry information cannot be created for an accurate three-dimensional image.

According to some embodiments of the inventive concept, each of the depth cameras can be initialized or synchronized to a frequency and/or phase of the reflected light. Thus, as compared with the case that each of the depth cameras is synchronized by an external single trigger, the effect of a distance deviation between the depth cameras and the host, and interference of the reflected light, can be reduced.

Figure 2:
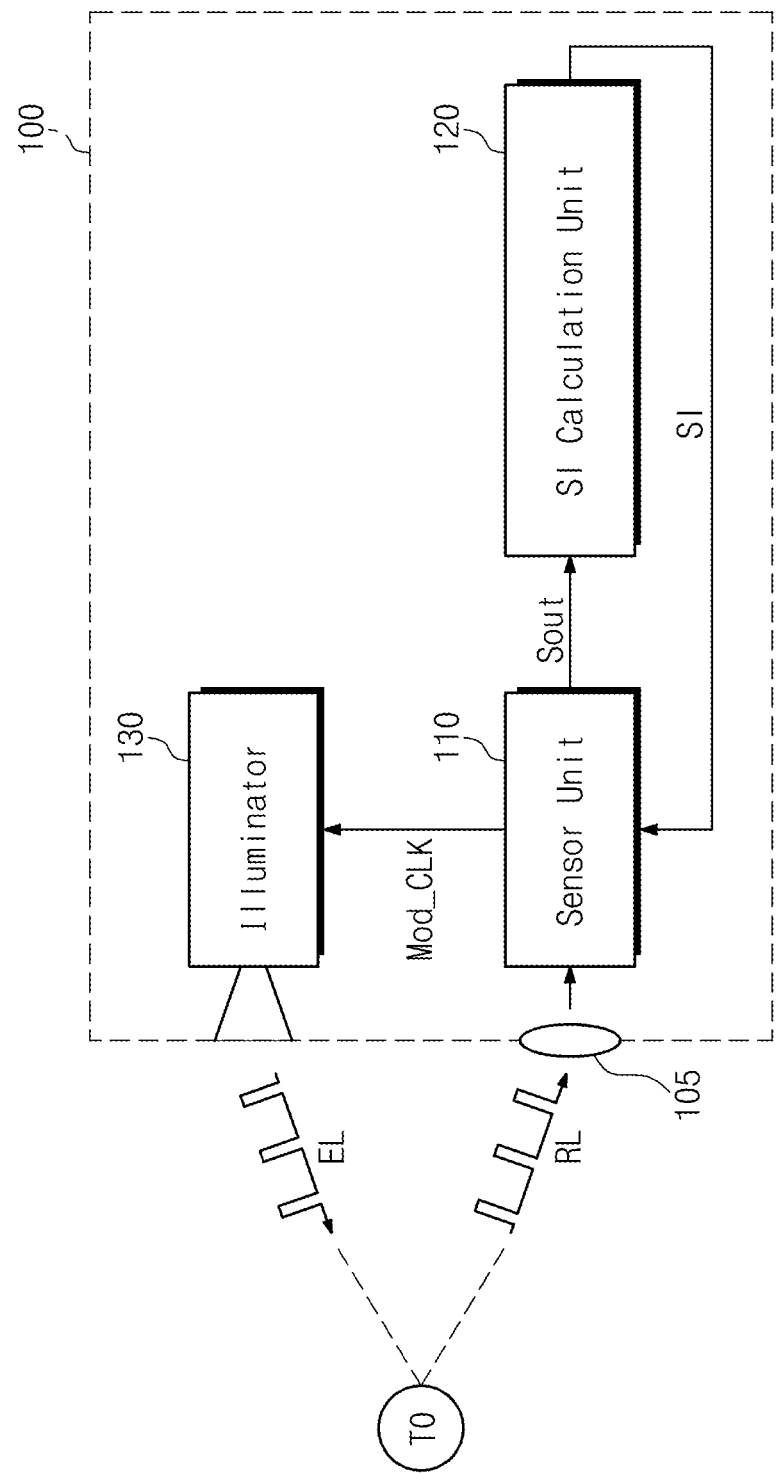
FIG. 2 is a block diagram illustrating one embodiment of a depth camera in accordance with the inventive concept.

FIG. 2 is a block diagram illustrating one embodiment of a depth camera in accordance with the inventive concept. Referring to FIG. 2, the depth camera 100 includes a lens 105, a sensor unit 110, a synchronization information calculation unit 120 and an illuminator 130. A frequency and/or a phase of a clock can be synchronized with the received reflected light by a feedback structure of sensor unit 110 and synchronization information calculation unit 120.

Lens 105 focuses reflected light being received by depth camera 100 to transmit the focused reflected light to sensor unit 110. Lens 105 is illustrated to be one convex lens but the inventive concept is not limited thereto. Lens 105 may be a convex lens, a concave lens or combination thereof. Lens 105 can be replaced with various optical structures.

Sensor unit 110 receives a reflected light (RL) from the target object (TO). Sensor unit 110 senses the reflected light (RL) focused through lens 105, beneficially using a plurality of sensor arrays. Sensor unit 110 accumulates electrical charges corresponding to the strength of the reflected light (RL). Sensor unit 110 outputs an electrical sensing signal Sout corresponding to the accumulated electrical charges. Sensor unit 110 transmits the sensing signal Sout to synchronization information calculation unit 120.

Sensor unit 110 may include a demodulation clock Demod_CLK (see, e.g., FIG. 3) for gating a cell of a sensor array of sensor unit 110, and a clock generator for generating a modulation clock Mod_CLK to control light emitted by illuminator 130.

Synchronization information calculation unit 120 measures performance of depth camera 100 with reference to the sensing signal Sout provided from sensor unit 110. For example, synchronization information calculation unit 120 can calculate a demodulation contrast or a depth error as a performance index with reference to the sensing signal Sout provided from sensor unit 110. Synchronization information calculation unit 120 can determine a control direction of the frequency and/or phase of the demodulation clock with reference to the calculated performance index. Synchronization information calculation unit 120 provides the calculated control information of frequency and/or phase to sensor unit 110 as synchronization information (SI).

Sensor unit 110 controls a phase of the modulation and/or demodulation clock being generated with reference to the synchronization information (SI) which feeds back from synchronization information calculation unit 120. If it needs to delay a phase of the modulation and/or demodulation clock for optimum performance, sensor unit 110 delays a phase of a clock generating unit. A phase of the modulation clock being provided to illuminator 130 and a phase of the demodulation clock being provided as a gating signal of the sensor array included in the sensor unit 110 are also delayed.

Illuminator 130 emits an emitted light (EL) into the target object (TO) according to the modulation clock Mod_CLK being provided from sensor unit 110. In particular, the emitted light (EL) from illuminator 130 may be modulated in accordance with the modulation clock MOD_CLK. For example, illuminator 130 can emit a series of light pulses corresponding to the frequency of the modulation clock Mod_CLK. Illuminator 130 can be realized by a light emitting diode (LED) array or a laser device. A pulse of light emitted from illuminator 130 may be variously realized to be infrared light, ultraviolet light, visible light, an ultrasonic wave, etc.

Depth camera 100 in accordance with some embodiments of the inventive concept can determine a phase and/or frequency of a modulation/demodulation clock that can provide maximum performance with reference to the reflected light (RL). Thus, depth camera 100 can determine a gating clock of the light sensor and a frequency and/or phase of the modulation/demodulation clock for generating the emitted light.

Figure 3:
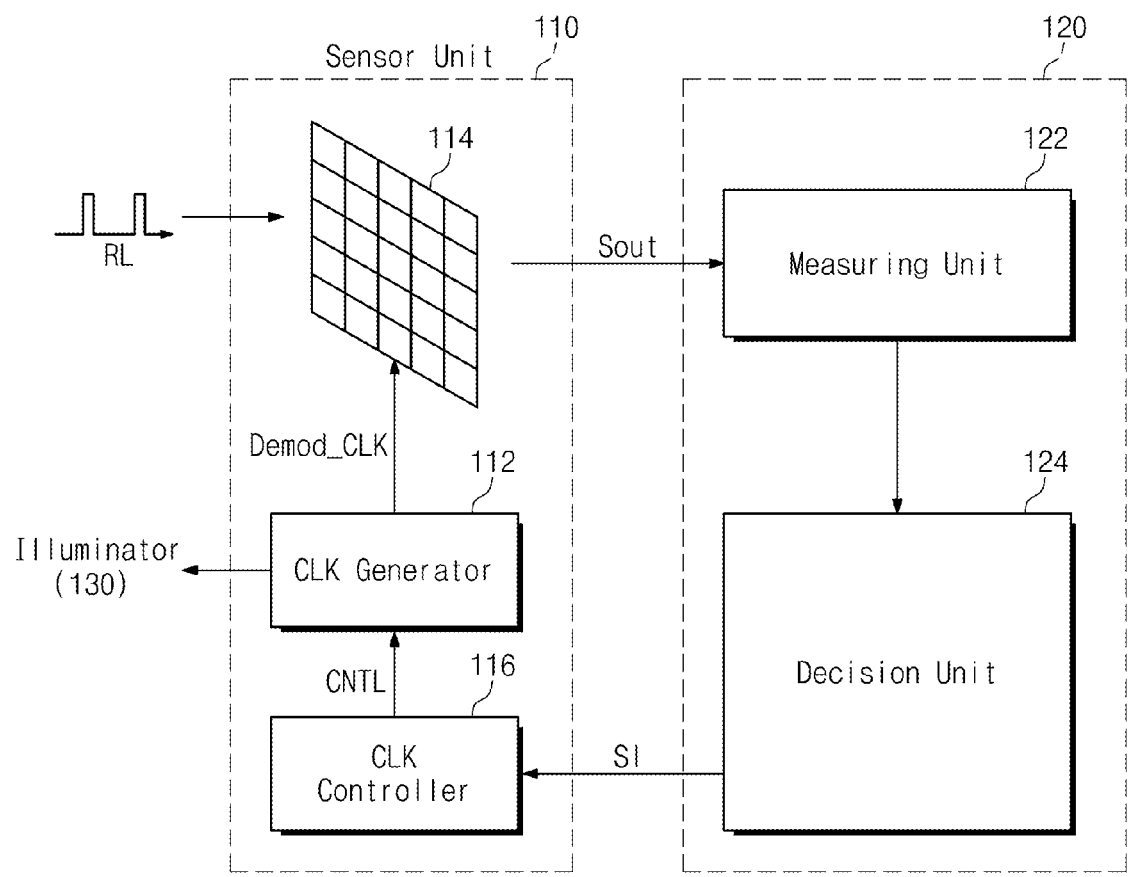
FIG. 3 is a block diagram illustrating in more detail embodiments of a sensor unit and a synchronization information calculation unit in accordance with the inventive concept.

FIG. 3 is a block diagram illustrating in more detail embodiments of a sensor unit 110 and a synchronization information calculation unit 120 according to the inventive concept. Referring to FIG. 3, sensor unit 110 includes a clock generator 112, a sensor array 114 and a clock controller 116.

Synchronization information calculation unit 120 includes a measuring unit 122 and a decision unit 124.

Clock generator 112 generates the modulation clock Mod_CLK being provided to illuminator 130 and the demodulation clock Demod_CLK being provided to sensor array 114 as a gating signal. Clock generator 112 can control a phase and/or frequency of the modulation/demodulation clock generated under control of clock controller 116.

Sensor array 114 senses the reflected light (RL) in synchronization with the demodulation clock Demod_CLK being provided from clock generator 112. A plurality of sensor pixels included in sensor array 114 sense the reflected light (RL) in synchronization with the demodulation clock Demod_CLK. For example, when a waveform of demodulation clock Demod_CLK is high, the plurality of sensor pixels may receive the reflected light (RL) to accumulate charges. Sensor array 114 can be embodied in a photodiode array or a photo gate array wherein the plurality of sensor pixels is two-dimensionally arranged.

Clock controller 116 can control a phase and/or frequency of clock generator 112 with reference to synchronization information (SI) provided from synchronization information calculation unit 120. Clock controller 116 can control the phase of the modulation clock Mod_CLK and/or demodulation clock Demod_CLK with reference to the synchronization information (SI). Clock controller 116 can also control the frequency of the modulation clock Mod_CLK and/or demodulation clock Demod_CLK with reference to the synchronization information (SI).

The synchronization information (SI) can indicate that a phase of the modulation clock Mod_CLK and/or demodulation clock Demod_CLK being generated is delayed as compared with a reference phase. Clock controller 116 can control clock generator 112 so that the phase of the modulation clock Mod_CLK and/or demodulation clock Demod_CLK being generated shifts in an opposite direction to the delay. In the opposite case, clock controller 116 can delay a phase of clock generator 112. Clock controller 116 can control the frequency of modulation clock Mod_CLK and/or demodulation clock Demod_CLK with reference to the synchronization information (SI).

Sensor unit 110 provides a signal Sout sensed in sensor array 114 to synchronization information calculation unit 120 and receives the synchronization information (SI) which is fed back from synchronization information calculation unit 120. Sensor unit 110 can adjust a phase and/or frequency of the modulation/demodulation clock with reference to the synchronization information (SI). Clock generator 112 is illustrated to be a constituent element of sensor unit 110 but the inventive concept is not limited thereto. That is, in some embodiments clock generator 112 may be located outside the sensor unit 110 to provide the modulation clock and the demodulation clock to sensor unit 110 and illuminator 130.

Synchronization information calculation unit 120 includes a measuring unit 122 and a decision unit 124. Measuring unit 122 measures a performance index of depth camera 100 with reference to a sensing signal Sout being provided from sense array 114. Measuring unit 122 can calculate a demodulation contrast (DC) from the sensing signal Sout being provided by sensing the reflected light (RL). The demodulation contrast (DC) represents a degree of precision of phase shift in each sensor pixel. If a phase shifts in a direction such that the demodulation contrast increases, the degree of precision of sensing the received reflected light increases and thereby performance is improved. Measuring unit 122 can calculate a depth error from the sensing signal Sout by sensing the reflected light (RL).

Decision unit 124 determines a compensation direction and a magnitude of a frequency and/or phase of clock generator 112 with reference to a performance index being provided from measuring unit 122. For example, decision unit 124 can determine a direction for controlling the phase such that the magnitude of the demodulation contrast DC increases. Decision unit 124 determines a direction of phase control, and provides this to clock controller 116 as synchronization information (SI). The decision operation of decision unit 124 can be applied to a frequency of the modulation clock Mod_CLK and/or the demodulation clock Demod_CLK.

A synchronization process of depth camera 100 of the inventive concept was described through a feedback structure of sensor unit 110 and synchronization information calculation unit 120. The depth camera can be synchronized with a reference emitted light by sensing the reflected light (RL). The reference emitting light may be provided from a separate depth camera located outside depth camera 100, or may be provided from a separate light emitting means.

Figure 4:
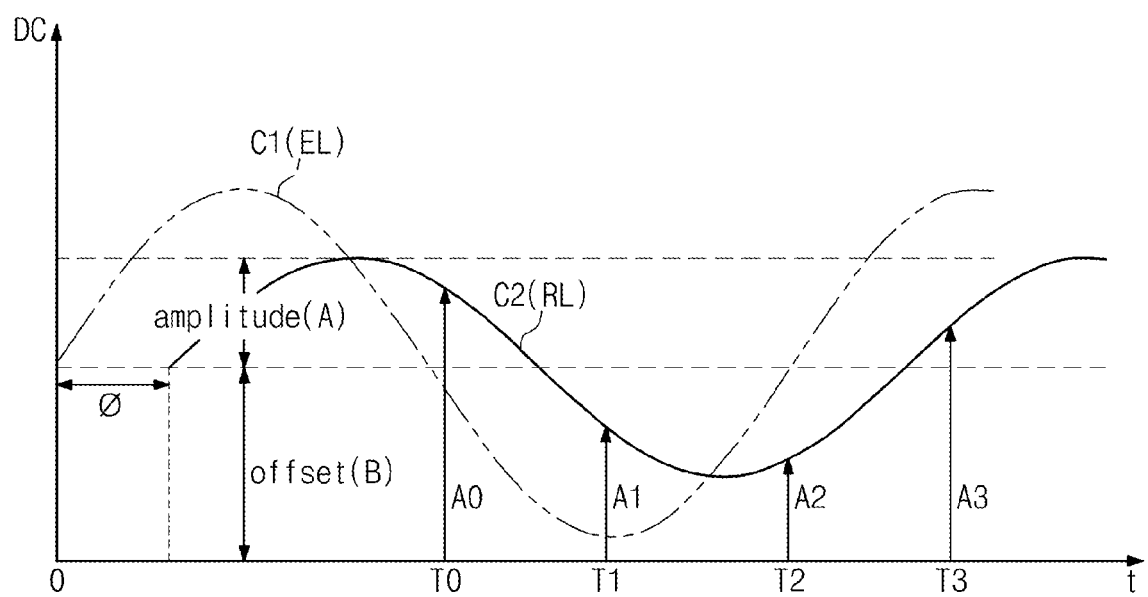
FIG. 4 is a graph illustrating a relationship between an emitting light and a reflected light in accordance with some embodiments of the inventive concept.

FIG. 4 is a graph illustrating a relationship between an emitting light (EL) and a reflected light (RL) in accordance with some embodiments of the inventive concept. Referring to FIG. 4, when the emitting light (EL) having a sinusoidal wave shape is emitted to an object, a waveform of the reflected light (RL) received by sensor unit 114 is as illustrated. In FIG. 4, the emitting light (EL) is represented by a curve C1 and the reflected light (RL) is represented by a curve C2.

The emitting light C1 and the reflected light C2 have a phase difference Φ between them. In particular, the reflected light C2 is received to be delayed by a phase difference Φ as compared with the emitting light C1. When the emitting light C1 and the reflected light C2 have the same frequency as each other, then the reflected light C2 represents a time-of-flight (ToF) corresponding to the phase difference Φ. A sensor pixel of sensor unit 110 may output depth information corresponding to the phase difference Φ.

The reflected light C2 is defined by an offset (B) representing a direct current value, and an amplitude (A) of the waveform. Amplitude (A) of the reflected light C2 can be obtained through amplitudes A0, A1, A2 and A3 corresponding to a plurality of sampling times T0, T1, T2 and T3 during one period. Amplitude (A) can be obtained by equation 1.

$$A = \frac{\sqrt{(A_3 - A_1)^2 + (A_2 - A_0)^2}}{2} \quad [\text{EQN 1}]$$

Offset (B) can be calculated by equation 2.

$$B = \frac{A_0 + A_1 + A_2 + A_3}{4} \quad [\text{EQN 2}]$$

The phase difference Φ and the measured depth are represented by equations 3 and 4 respectively.

$$\Phi = \tan^{-1}\left(\frac{A_3 - A_1}{A_0 - A_2}\right) + \pi \quad [\text{EQN 3}]$$

$$\text{Depth} = \frac{c}{4\pi f}\Phi \quad [\text{EQN 4}]$$

Here, c is the speed of light, f is the frequency of the reflected light, and (I) is the phase difference between the emitting light and the reflected light.

Various performance indexes of the depth camera can be obtained with respect to the reflected light C2 defined by the above-mentioned parameters. Examples of the performance index are a demodulation contrast (DC), a depth error, etc.

The demodulation contrast (DC), which is an example of a performance index, can be calculated by equation 5.

$$DC = \frac{A}{B} \quad [\text{EQN 5}]$$

Here, A is the measured amplitude and B is the measured offset.

The depth error (DE), which is another example of a performance index, can be calculated by equation 6.

$$DE = \frac{\text{VAR(Depth)}}{\text{Distance}} \quad [\text{EQN 6}]$$

Here, "Distance" is a distance between a target object and the depth camera.

Measuring unit 122 can obtain those indices using the parameters of the reflected light C2. Decision unit 124 can determine a shift direction of phase, or an addition and subtraction of frequency, for the reflected light to be synchronized with the reference emitting light, with reference to the performance index.

Figure 5:
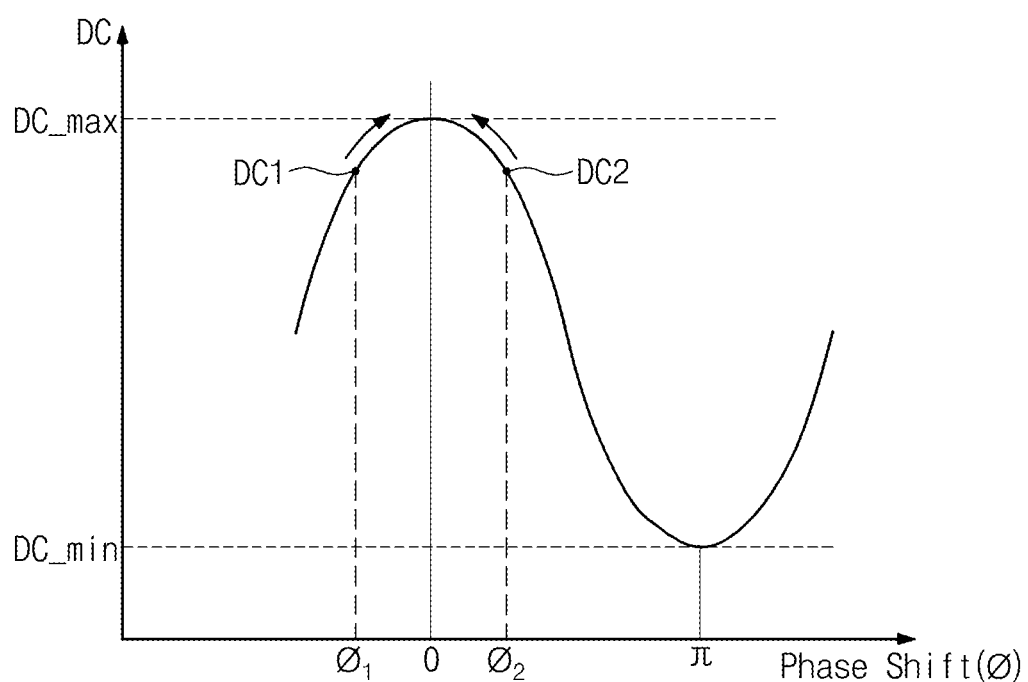
FIG. 5 is a graph illustrating a waveform of demodulation contrast (DC) as an example of a performance index of a depth camera.

FIG. 5 is a graph illustrating a waveform of the demodulation contrast (DC) as an example of a performance index of a depth camera. Referring to FIG. 5, a value of the demodulation contrast (DC) varies depending on a phase difference between the emitting light and the reflected light. Decision unit 124 can determine a control direction of the phase and/or frequency with reference to the demodulation contrast (DC) calculated through the reflected light that is currently being sensed or detected.

The demodulation contrast (DC) is a parameter which can represent the measurement degree of precision of the phase shift. The greater the demodulation contrast (DC) is, the higher the degree of precision of the measurement by the sensor pixel is. In the case of using multi cameras, as the synchronization of the depth cameras with respect to a light source becomes more accurate, the demodulation contrast (DC) becomes greater. When using two depth cameras, the demodulation contrast (DC) is maximized when a phase difference between the emitting lights of the depth cameras is zero. The demodulation contrast (DC) is minimized when a phase difference between the emitting lights of the depth cameras is 180° (or π).

Thus, decision unit 124 can provide the synchronization information (SI) indicating the direction that a phase difference is reduced considering the transition of the change. For example, with reference to FIG. 5, if the level of the demodulation contrast (DC) currently measured is DC1, decision unit 124 can generate the synchronization information (SI) so as to increase the phase of the emitting light of the depth camera. On the other hand, if the level of the demodulation contrast (DC) currently measured is DC2, decision unit 124 can generate the synchronization information (SI) so as to decrease the phase of the emitting light of the depth camera.

Figure 6:
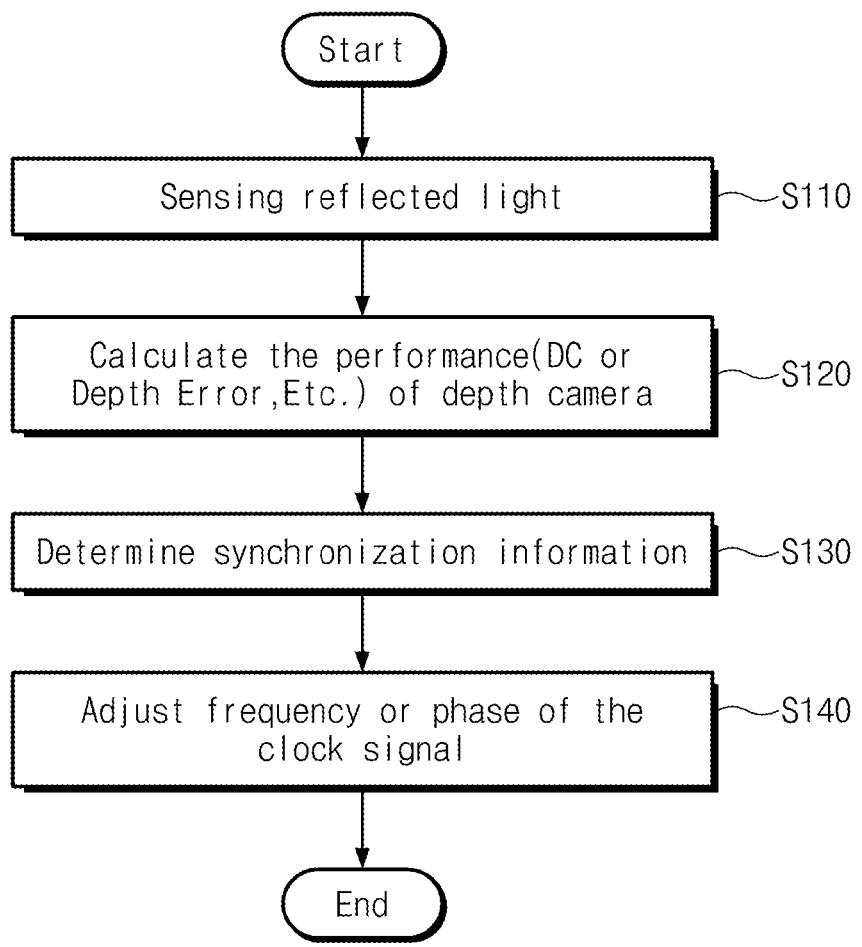
FIG. 6 is a flow chart illustrating an embodiment of a phase and/or frequency synchronization method performed in a depth camera in accordance with the inventive concept.

FIG. 6 is a flow chart illustrating a phase and/or frequency synchronization method performed in a depth camera of the inventive concept. Referring to FIGS. 3 and 6, the depth camera in accordance with some embodiments of the inventive concept can control the phase and/or frequency of a demodulation clock being provided to sensor unit 110 and/or a modulation clock being provided to the illuminator 130 with reference to a performance index calculated through a measurement of the reflected light (RL).

In a step S110, sensor unit 110 of depth camera 100 senses the reflected light (RL) which is currently being received. By the reflected light (RL) being currently received, each sensor pixel of sensor array 114 is synchronized with the demodulation clock Demod_CLK to accumulate charges. A pulse light signal of the reflected light (RL) of the level corresponding to the accumulated charges is provided to measuring unit 122 as an electrical sensing signal Sout.

In a step S120, measuring unit 122 calculates a performance index from the sensing signal Sout being output from sensor unit 110. For example, measuring unit 122 may calculate a demodulation contrast (DC) or a depth error (DE) from the sensing signal Sout. Measuring unit 122 transmits the calculated performance index to decision unit 124.

In a step S130, decision unit 124 determines whether adding or subtracting phase and/or frequency with respect to the current phase and/or frequency of the modulation clock and/or demodulation clock can increase performance. For example, decision unit 124 may generate synchronization information (SI) so that the modulation clock Mod_CLK of the emitting light (EL) has a phase which maximizes the demodulation contrast (DC).

In a step S140, clock controller 116 controls a phase and/or frequency of clock generator 112 with reference to synchronization information (SI). In particular, the frequency and/or phase of the modulation and/or demodulation clocks of the depth camera are controlled to be synchronized with a reference frequency and/or phase of the depth camera.

According to the processes described above, depth camera 100 can synchronize the frequency and/or phase of its modulation and/or demodulation clocks for sensing or emitting light, with clocks of other depth cameras of a multi depth camera.

Figure 7:
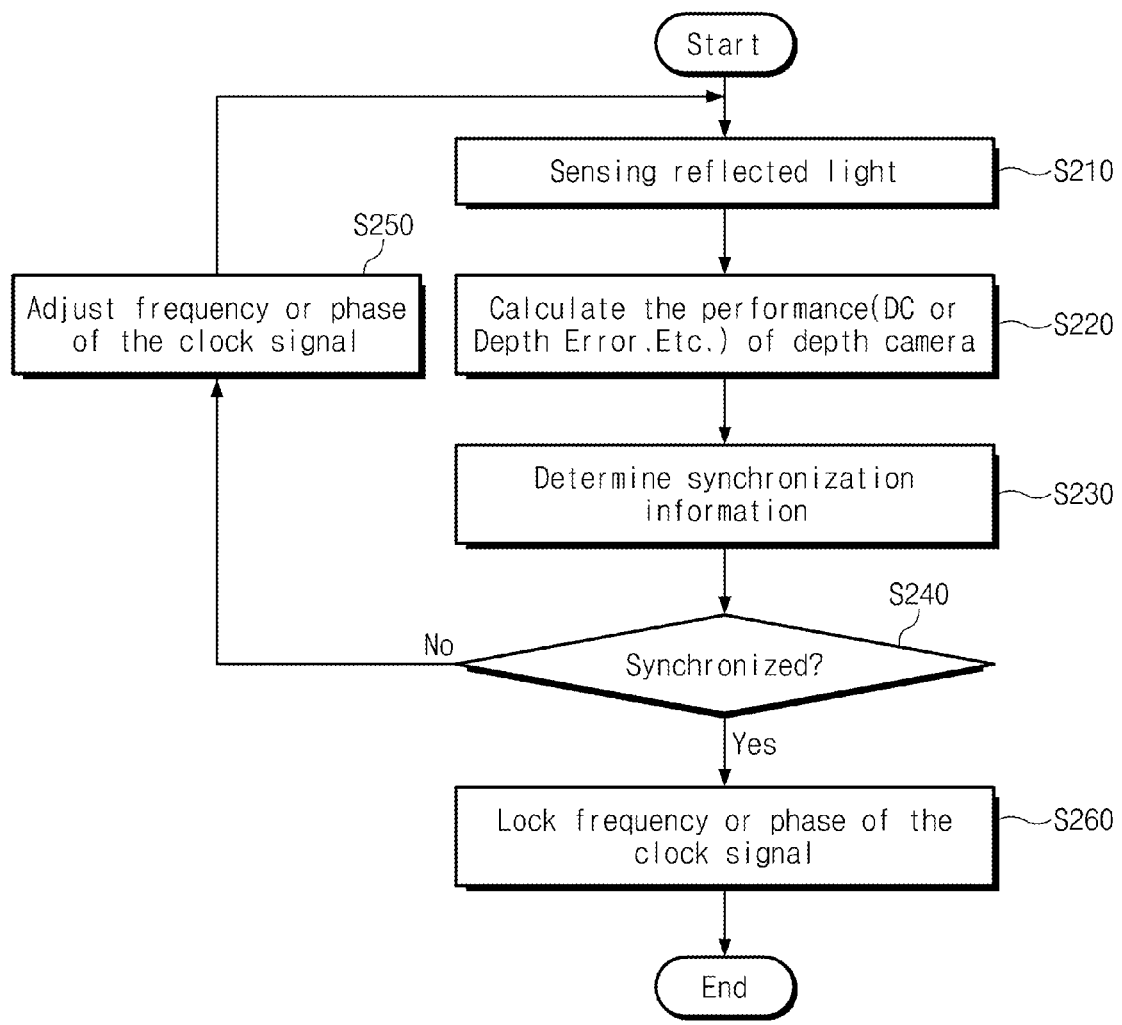
FIG. 7 is a flow chart illustrating some other embodiments of synchronization methods of the depth camera of FIG. 2.

FIG. 7 is a flow chart illustrating some other embodiments of synchronization method of depth camera of FIG. 2. Referring to FIGS. 3 and 7, depth camera 100 performs a plurality of synchronization loops at an initializing operation or reset operation to be fixed to the optimum frequency or phase.

In a step S210, sensor unit 110 of depth camera 100 senses the reflected light (RL) currently being received. Each sensor pixel of sensor array 114 which senses or detects the reflected light (RL) currently being received is synchronized with the demodulation clock Demod_CLK to accumulate charges. A light pulse signal of the reflected light (RL) having a level corresponding to the accumulated charges is provided to measuring unit 122 as the electrical sensing signal Sout.

In a step S220, measuring unit 122 calculates a performance index from the sensing signal Sout being output from sensor unit 110. Measuring unit 122 calculates a demodulation contrast (DC) or a depth error from a sensing signal Sout. The measuring unit 122 transmits the calculated performance index to decision unit 124.

In a step S230, decision unit 124 determines a direction of adding or subtracting to a current frequency and/or phase which may increase the performance of sensor unit 110. For example, decision unit 124 can generate synchronization information (SI) so as to generate a modulation clock Mod_CLK and/or demodulation clock Demod_CLK so that a value of demodulation contrast (DC) is maximized.

In a step S240, with reference to the determined performance index, it is determined whether the modulation clock Mod_CLK and/or demodulation clock Demod_CLK of depth camera 100 is synchronized with an optimum frequency or phase. If it is determined that the modulation clock Mod_CLK and/or demodulation clock Demod_CLK of depth camera 100 is synchronized with the optimum frequency or phase, a process goes to a step S260 for locking the modulation clock Mod_CLK and/or demodulation clock Demod_CLK at the synchronized frequency or phase. If it is determined that the modulation clock Mod_CLK and/or demodulation clock Demod_CLK of depth camera 100 is not synchronized with an optimum frequency or phase, then the process goes to a step S250.

In step S250, clock controller 116 adjusts the phase and/or frequency of clock generator 112 with reference to synchronization information (SI) being provided from decision unit 124. Then the process returns to step S210 for sensing the reflected light (RL) under conditions of an adjusted modulation clock Mod_CLK and/or demodulation clock Demod_CLK.

In step S260, clock controller 116 sets up clock generator 112 so as to output a modulation clock Mod_CLK and/or a demodulation clock Demod_CLK of the synchronized frequency or phase.

The steps S210, S220, S230, S240 and S250 constitute an operating loop for adjusting a frequency and/or phase. That operating loop repeats until a modulation and/or demodulation clock of depth camera 100 is synchronized with an emitting light (EL) which becomes a reference of a multi camera system.

Figure 8:
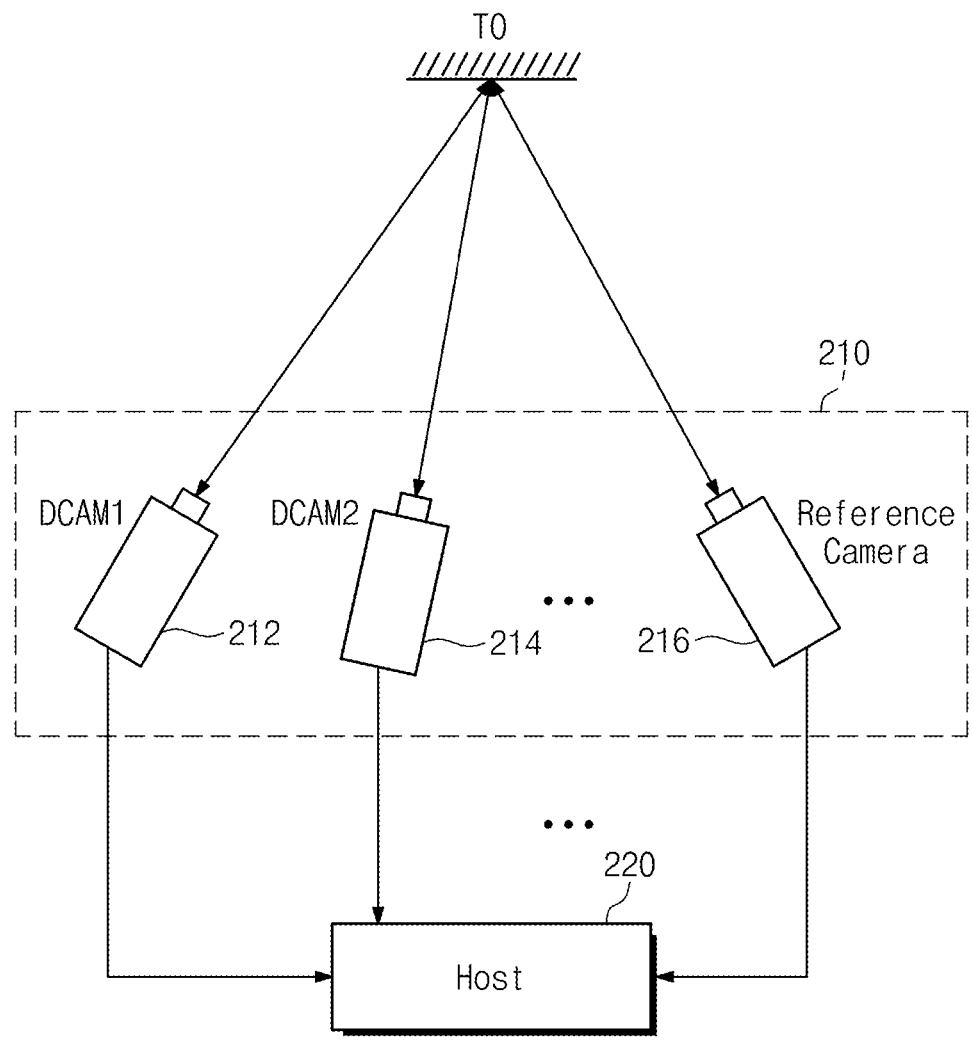
FIG. 8 is a drawing illustrating a three-dimensional camera system using a plurality of the depth cameras of FIG. 2.

FIG. 8 is a drawing illustrating a three-dimensional camera system 200 using the plurality of the depth cameras which are illustrated in FIG. 2. Multi camera system 200 includes a multi camera 210 and a host 220.

Multi camera 210 includes a plurality of depth cameras 212, 214 and 216. Each depth camera includes an illuminator and a sensor unit. Thus, each depth camera can perform a frequency and/or phase synchronization with reference to an emitting light (EL) being independently received. The plurality of depth cameras 212, 214 and 216 includes a reference camera 216.

Reference camera 216 emits an emitting light (EL) generated by a modulation clock of a locked frequency or phase into a target object (TO). Reference camera 216 receives a reflected light (RL) at a specified location to generate depth information of the target object (TO). The depth information generated by reference camera 216 is provided to host 220. That is, reference camera 216 operates with a fixed value without adjusting a modulation or demodulation clock.

Depth cameras 212 and 214 other than reference camera 216 perform a frequency and/or phase synchronization of a modulation clock and/or a demodulation clock in response to the reflected light being received. Thus, depth cameras 212 and 214 each perform a frequency and/or phase synchronization so that the frequency and/or phase of their modulation and/or demodulation clocks are synchronized with reference camera 216. That is, the modulation clock and/or demodulation clock of depth cameras 212 and 214 can be synchronized with the frequency and/or phase of modulation of the emitting light (EL) emitted from reference camera 216.

According to the synchronization process, an electrical delay does not occur as compared with a case of being synchronized through a trigger by host 220. Even though a slight frequency or phase shift of reference camera 216 occurs, all the depth cameras included in multi camera system 200 can be organically synchronized by an adaptive synchronization operation of depth cameras 212 and 214. Thus, it is possible to obtain accurate configuration information on the target object.

Host 220 processes depth information provided from depth cameras 212, 214 and 216. Host 220 can recreate a three-dimensional image of a target object at multiple positions. Host 220 can select reference camera 216 defining a frequency reference and a phase reference among plurality of depth cameras 212, 214 and 216. A depth camera selected as the reference camera calculates a performance index according to selection information but does not perform an operation adjusting the phase and/or frequency of its clock(s).

Figure 9:
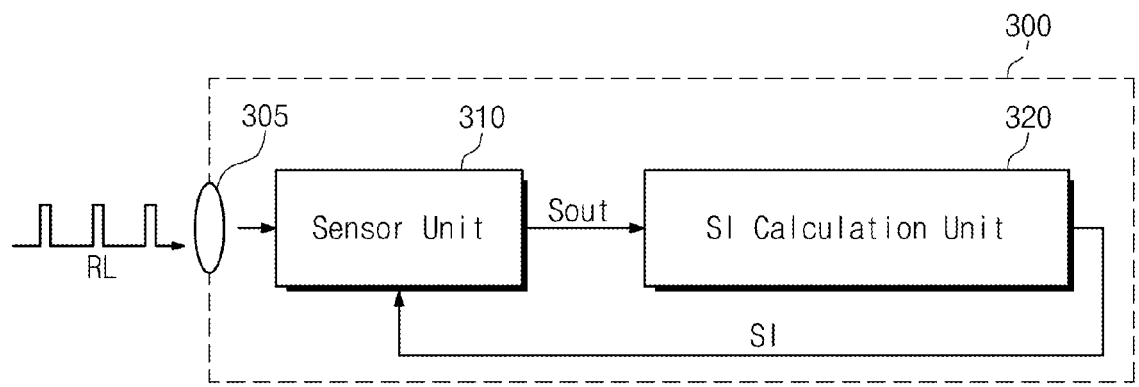
FIG. 9 is a block diagram illustrating some other embodiments of the depth camera in accordance with the inventive concept.

FIG. 9 is a block diagram illustrating some other embodiments of the depth camera of the inventive concept. Referring to FIG. 9, depth camera 300 includes a lens 305, a sensor unit 310 and a synchronization information calculation unit 320. Depth camera 300 does not include an illuminator. Thus, only a demodulation clock Demod_CLK being provided to sensor unit 310 by synchronization is adjusted with reference to reflected light which is sensed or detected by sensor unit 310.

Lens 305 focuses the reflected light being received by depth camera 300 to transmit the focused reflected light to sensor unit 310. Lens 305 is illustrated to be one convex lens but the inventive concept is not limited thereto. Lens 305 can be replaced with various light-receiving means or light focusing means having transparent quality of the material.

Sensor unit 310 receives the reflected light (RL) from a target object (TO). Sensor unit 310 senses the reflected light (RL) focused through lens 305 using a plurality of sensor array. Sensor unit 310 accumulates electrical charges corresponding to a strength of the reflected light (RL) which is being received. Sensor unit 310 can obtain a waveform, frequency and/or phase information of the reflected light (RL) according to the accumulated electrical charges. Sensor unit 310 transmits the obtained information to synchronization information calculation unit 320 as a sensing signal Sout.

A clock generator for creating a demodulation clock Demod_CLK to gate a pixel of sensor array is included in sensor unit 310.

Synchronization information calculation unit 320 measures performance of depth camera 300 with reference to the sensing signal Sout being provided from sensor unit 310. Synchronization information calculation unit 320 can calculate a demodulation contrast or a depth error as a performance index with reference to the sensing signal Sout. Synchronization information calculation unit 320 can determine a direction of a phase shift of the demodulation clock Demod_CLK for improving performance with reference to the calculated performance index. Synchronization information calculation unit 320 provides the determined synchronization information to sensor unit 310.

Sensor unit 310 adjusts the phase of the demodulation clock Demod_CLK being generated with reference to the synchronization information (SI) which feeds back from synchronization information calculation unit 320. In the case that a phase of the clock signal needs to be delayed for optimum performance, then sensor unit 310 delays the phase of the clock generator. When the phase of the clock generator is delayed, then the phase of the demodulation clock Demod_CLK provided as a gating signal of sensor array included in sensor unit 310 is also delayed.

Depth camera 300 can determine a phase of frequency of clock that can provide the maximum performance with reference to a reflected light (RL). Thus, a frequency and/or phase of demodulation clock Demod_CLK for generating a gating clock of optical sensor can be determined with reference to an optical sensor.

Figure 10:
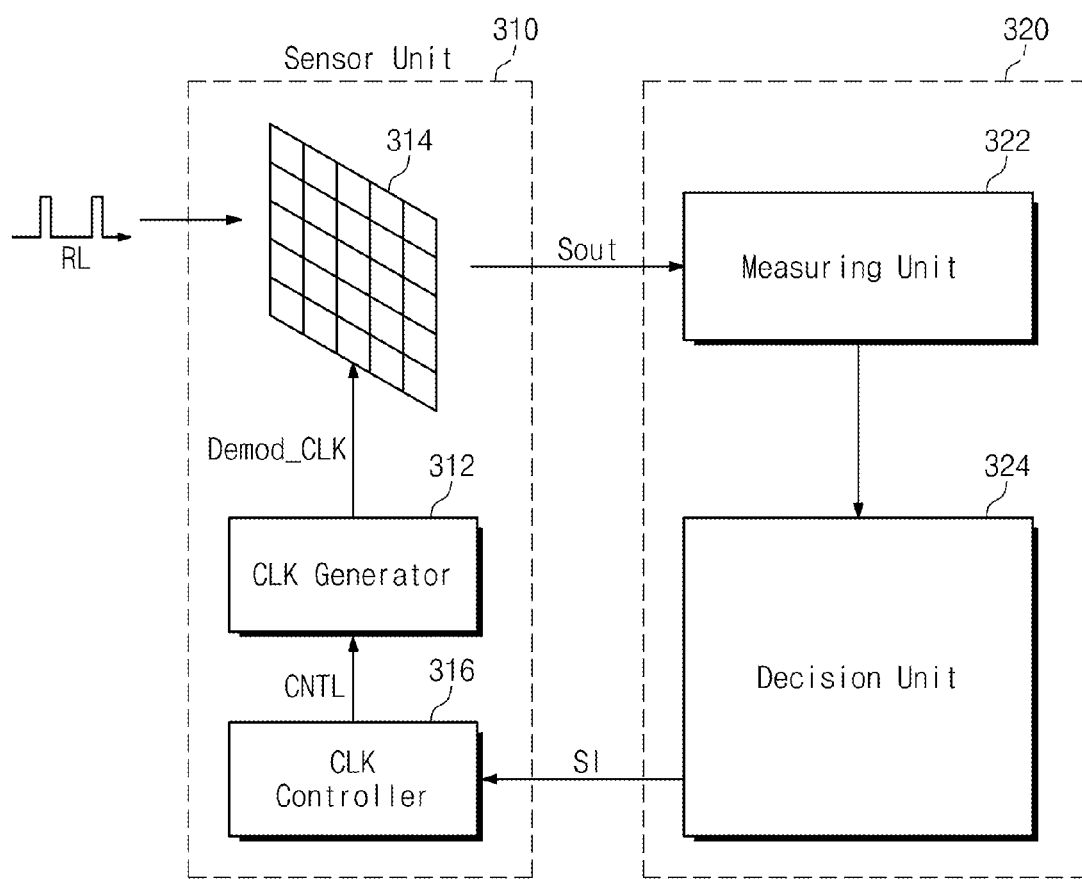
FIG. 10 is a block diagram illustrating in more detail other embodiments of a sensor unit and a synchronization information calculation unit in accordance with the inventive concept.

FIG. 10 is a block diagram illustrating a sensor unit and a synchronization information calculation unit of the inventive concept in more detail. Referring to FIG. 10, sensor unit 310 includes a clock generator 312, a sensor array 314 and a clock controller 316. Synchronization information calculation unit 320 includes a measuring unit 322 and a decision unit 324.

Sensor unit 310 includes a clock generator 312, a sensor array 314 and a clock controller 316. Clock generator 312 generates a demodulation clock Demod_CLK being provided as a sensing clock of sensor array 314. Under control of clock controller 316, clock generator 312 can control the phase and/or frequency of the generated clock signal Demod_CLK.

Sensor array 314 senses a reflected light (RL) in synchronization with the demodulation clock Demod_CLK provided from clock generator 312. A plurality of sensor pixels included in sensor array 314 sense the reflected light (RL) in synchronization with the demodulation clock Demod_CLK. For example, when a waveform of the demodulation clock Demod_CLK is high, the plurality of sensor pixels may receive the reflected light (RL) to accumulate charges. Sensor array 314 can be embodied in a photodiode array or a photo gate array wherein the plurality of sensor pixels is two-dimensionally arranged.

Clock controller 316 can control the phase and/or frequency of clock generator 312 with reference to synchronization information (SI) provided from synchronization information calculation unit 320. Clock controller 316 can control the phase of the demodulation clock Demod_CLK with reference to the synchronization information (SI). Clock controller 316 can also adjust the frequency of demodulation clock Demod_CLK with reference to the synchronization information (SI).

Sensor unit 310 provides a signal sensed in sensor array 314 to synchronization information calculation unit 320 and can adjust the phase and/or frequency of the clock with reference to the synchronization information (SI) which feeds back from synchronization information calculation unit 320. Clock generator 312 is illustrated to be a constituent element of sensor unit 310 but the inventive concept is not limited thereto. That is, in some embodiments, clock generator 312 may be located outside sensor unit 310 to provide the demodulation clock to sensor unit 310.

The synchronization information calculation unit 320 includes a measuring unit 322 and a decision unit 324. Measuring unit 322 measures a performance index of depth camera 300 with reference to the sensing single Sout provided from sensor array 314. For example, measuring unit 322 may calculate a demodulation contrast (DC) or depth error (DE) from a sensing signal Sout provided by sensing the reflected light (RL).

For example, with reference to a value of the demodulation contrast (DC), decision unit 324 determines a phase shift in a direction such that an amplitude of the demodulation contrast (DC) increases. Decision unit 324 determines a direction of the phase shift to provide it to clock controller 316 as synchronization information (SI).

A method of controlling a clock that can improve performance through a feedback structure of synchronization information calculation unit 320 has been described above.

Figure 11:
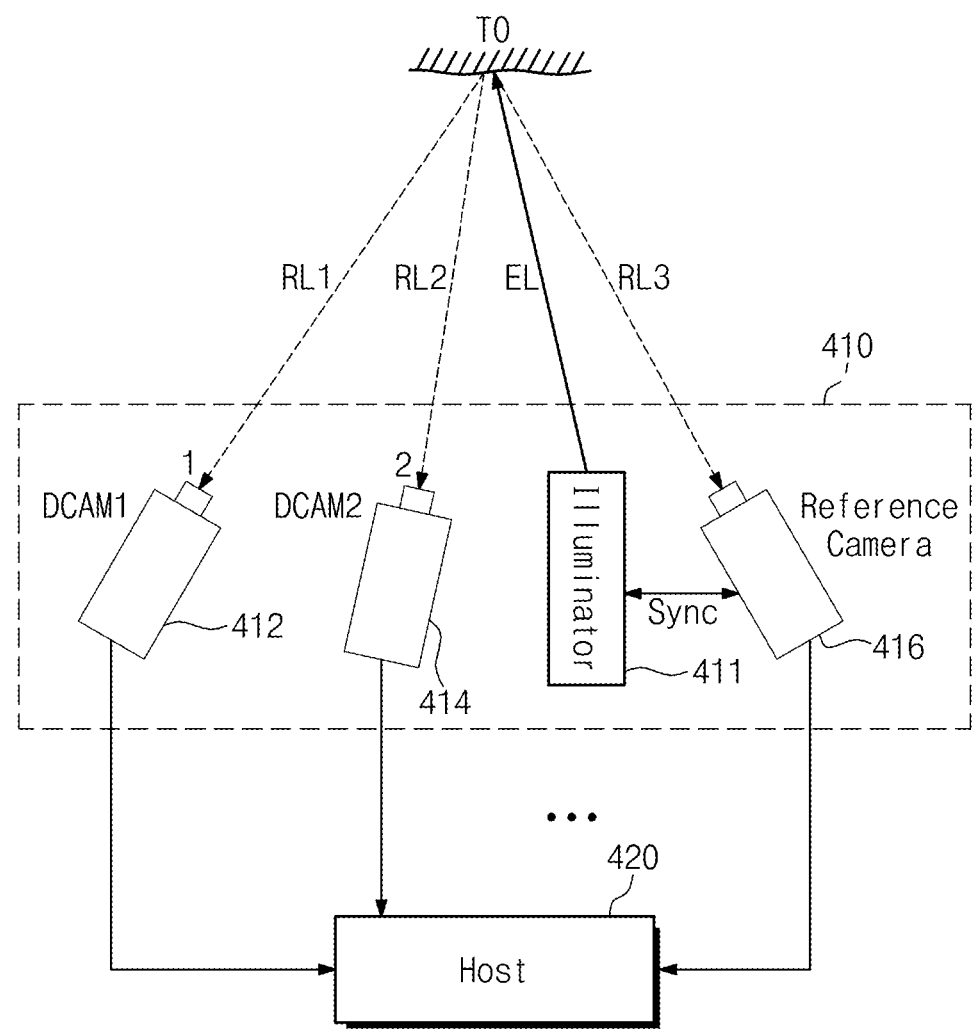
FIG. 11 is a drawing illustrating a three-dimensional camera system using a plurality of the depth cameras of FIG. 9.

FIG. 11 is a drawing illustrating a three-dimensional camera system using the plurality of depth cameras which are illustrated in FIG. 9. Referring to FIG. 11, multi camera system 400 of the inventive concept includes a multi camera 410 and a host 420.

Multi camera 410 includes a plurality of depth cameras 412, 414 and 416. Each depth camera includes a sensor unit. Beneficially, none of the depth cameras includes an illuminator. Only one illuminator 411 is included in multi camera 410.

In the above-mentioned structure, reference camera 416 is synchronized with illuminator 411. In that case, a gating of illuminator 411 and the pixel array of reference camera 416 is synchronized. And then, depth cameras 412 and 414 are synchronized by a light emitted from illuminator 411 of which the phase and the frequency are synchronized by reference camera 416. Thus, frequencies and phases of depth cameras 412 and 414 are synchronized with reference camera 416.

According to the synchronization process, an electrical delay does not occur as compared with a case of being synchronized through a trigger by host 420. Even though a slight frequency or phase shift of reference camera 416 occurs, all the depth cameras included in multi camera system 400 can be organically synchronized by an adaptive synchronization operation of depth cameras 412 and 414. Thus, it is possible to obtain accurate configuration information on the target object.

Host 420 processes depth information provided from depth cameras 412, 414 and 416. Host 420 can recreate a three-dimensional image of a target object at multiple positions. Host 420 can select reference camera 416 defining the frequency reference and the phase reference among the plurality of depth cameras 412, 414 and 416. A depth camera selected as the reference camera calculates a performance index according to selection information, but does not perform an operation adjusting the phase and/or frequency of its clock(s).

The camera device or the camera system according to the inventive concept can be mounted using various types of packages. The flash memory device and/or the memory controller in accordance with the inventive concept can be mounted by various types of packages such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

According to the inventive concept, through an efficient synchronization of multi depth camera, an accuracy of depth image can be improved, an occlusion of image can be reduced and a power of light source can be reduced.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the present invention. Accordingly, all such modifications are intended to be included within the scope of the present invention as defined in the claims. The present invention is defined by the following claims, with equivalents of the claims to be included therein.

What is claimed is:

1. A depth camera comprising:
   a sensor unit configured to receive a reflected light and in response thereto to output an electrical sensing signal; and
   a synchronization information calculation unit configured to calculate a performance index with reference to the electrical sensing signal, and with reference to the performance index to generate synchronization information for synchronization of a demodulation clock for sensing the received reflected light, wherein the sensor unit is configured to adjust at least one of a frequency and a phase of the demodulation clock with reference to the synchronization information, and wherein the performance index comprises a demodulation contrast representing a ratio of a measured amplitude of the received reflected light to a measured offset of the received reflected light.

2. The depth camera of claim 1, wherein the sensor unit adjusts the phase of the demodulation clock with reference to the synchronization information so that a sensing degree of precision with respect to the received reflected light is maximized.

3. The depth camera of claim 1, wherein the sensor unit comprises:
   a sensor array configured to sense the received reflected light in synchronization with the demodulation clock and to provide the electrical sensing signal to the synchronization information calculation unit;
   a clock generator configured to provide the demodulation clock to the sensor array; and
   a clock controller configured to control the clock generator with reference to the synchronization information.

4. The depth camera of claim 3, further comprising a light emitting unit configured to emit an emitting light in synchronization with a modulation clock provided from the clock generator.

5. The depth camera of claim 1, wherein the synchronization information calculation unit comprises:
   a measuring unit configured to calculate the performance index with reference to the electrical sensing signal; and
   a decision unit configured to determine a compensation direction of at least one of the frequency and the phase of the demodulation clock with reference to the performance index.

6. A method of synchronizing a depth camera receiving a light reflected from a target object to generate depth information, the method comprising:
   sensing a reflected light being received, and in response thereto outputting an electrical sensing signal;
   calculating a performance index of the depth camera with reference to the electrical sensing signal; and
   with reference to the performance index, adjusting at least one of a frequency and a phase of a demodulation clock for sensing the received reflected light,
   wherein the performance index comprises a demodulation contrast representing a ratio of a measured amplitude of the received reflected light to a measured offset of the received reflected light.

7. The method of claim 6, wherein in the step of adjusting the at least one of the frequency and the phase of the demodulation clock, the demodulation clock is adjusted so as to maximize the demodulation contrast.

8. The method of claim 6, further comprising emitting an emitting light onto the target object, the emitting light being optically modulated by a modulation clock corresponding to the demodulation clock.

9. The method of claim 6, further comprising determining whether the demodulation clock is synchronized for optimum sensing of the reflected light.

10. The method of claim 9, wherein when it is determined that the demodulation clock is synchronized for optimum sensing, then at least one of the frequency and the phase of the demodulation clock is locked.

11. A multi depth camera system, comprising:
    a plurality of depth cameras including at least one reference camera; and
    a host configured to receive depth information for one or more areas of a target object from each of the plurality of depth cameras and in response thereto to generate a three-dimensional image of the one or more areas of the target object,
    wherein at least one of the depth cameras includes a sensor unit that senses reflected light received from the target object in response to a demodulation clock of the at least one depth camera, and wherein the at least one depth camera synchronizes the demodulation clock to the reference camera in response to the received reflected light.

12. The multi depth camera of claim 11, further comprising an illuminator external to the reference camera, wherein the illuminator is configured to emit light onto the target object, and wherein the illuminator is synchronized with the reference camera.

13. The multi depth camera of claim 11, wherein the host is configured to select which of the plurality of depth cameras is the reference camera.

14. The multi depth camera of claim 11, wherein the sensor unit is configured to output an electrical sensing signal in response to the received reflected light, and wherein the at least one depth camera further comprises:
    a synchronization information calculation unit configured to calculate a performance index with reference to the electrical sensing signal, and with reference to the performance index to generate synchronization information for synchronization of the demodulation clock;
    a clock generator configured to provide the demodulation clock to a sensor array of the sensing unit; and
    a clock controller configured to control the clock generator with reference to the synchronization information.

15. The multi depth camera of claim 14, wherein the performance index comprises a demodulation contrast representing a ratio of a measured amplitude of the received reflected light to a measured offset of the received reflected light.

16. The multi depth camera of claim 14, wherein the performance index comprises a depth error of the received reflected light.

* * * * *